Figure 1:
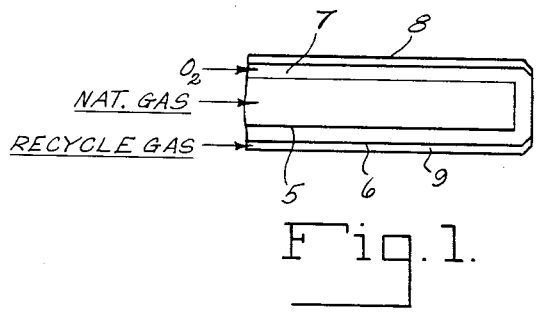

June 26, 1956  J. H. ARNOLD  2,752,232
PRODUCTION OF SYNTHESIS GAS
Filed Aug. 25, 1951

INVENTOR.
JOHN H. ARNOLD
BY
ATTORNEYS

United States Patent Office 2,752,232
Patented June 26, 1956

2,752,232

PRODUCTION OF SYNTHESIS GAS

John Henry Arnold, Summit, N. J., assignor to Hydrocarbon Research, Inc., New York, N. Y., a corporation of New Jersey Application August 25, 1951, Serial No. 243,636

4 Claims. (Cl. 48—196)

This invention relates to a method and apparatus for the production of carbon monoxide and hydrogen by the partial combustion of a gasiform hydrocarbon. This invention is particularly useful in the production of synthesis gas by partial combustion of a gaseous hydrocarbon with oxygen-enriched air or substantially pure oxygen. In one of its more specific aspects, the present invention relates to a method of introducing the reactant gases for the production of synthesis gas.

The generation of synthesis gas, i. e., a mixture of carbon monoxide and hydrogen, by partial combustion of a hydrocarbon with an oxygen-containing gas, is known in the art. By this process, a hydrocarbon fuel is reacted with air, oxygen-enriched air or with relatively pure oxygen at a temperature within the range of from about 2,000° F. to about 3,000° F. The operation may be carried out at atmospheric or at an elevated pressure, for example, as high as 500 pounds per square inch gauge. Synthesis gas is used commercially for the manufacture of hydrocarbons, oxygenated hydrocarbons, and ammonia. It is also important as a source of hydrogen for other chemical processes.

It has been found desirable to introduce the fuel gas and oxygen-containing gas separately into the reaction zone and to effect mixing of the reactants within the reaction zone. For efficiency of conversion of the reactants to carbon monoxide and hydrogen and minimum production of undesirable by-products, such as carbon dioxide, water vapor, and free carbon in the reactor, it is desirable to effect rapid and intimate mixing of the reactants. Premixing the reactants has not proved successful for substantially pure oxygen and gaseous hydrocarbons. One of the chief disadvantages of premixing the reactants is the tendency for the flame to flash back into the supply conduit through which the mixture is introduced into the reaction zone. These flash-backs occur even though the velocity at which the stream of reactants is introduced is in excess of the rate of flame propagation.

The separate introduction of concentrated oxygen and fuel gas poses some problems, the principal one of which is that of insuring complete mixing of the reactants at the point of introduction to the reaction zone. Any fuel gas which is not admixed with oxygen immediately upon introduction to the reaction zone cracks to form free carbon. Any oxygen which is unmixed at the point of introduction to the reaction zone attacks the exposed surfaces, such as the burner elements and the walls of the reaction zone. The present invention is designed to overcome the disadvantages of burners, i. e., the apparatus used for introducing and mixing the reactants, and to provide improved burners of the type in which the reactants are separately introduced and admixed in the reaction zone.

An object of this invention is to provide an improved method for the introduction of fuel gas and oxygen into a reaction zone in which carbon monoxide and hydrogen are formed by the partial combustion of hydrocarbons with relatively pure oxygen. Another object of this invention is to provide improved apparatus for the generation of carbon monoxide and hydrogen.

In accordance with the present invention, fuel gas and oxygen-containing gas are introduced into the reaction zone as separate streams into admixture with one another. A stream of product gas from the reaction is injected into the reaction zone adjacent and surrounding the reactant gas streams to prevent free oxygen from coming in contact with adjacent portions of the burner structure or the walls of the reaction zone. The invention will be more readily understood from the following detailed description of the invention as applied to different types of burners.

One of the most commonly used burners is the annulus type burner or one in which the reactant gases are introduced into the reactor through concentric conduits. In the annulus type burner, one of the gases is passed through a central conduit while the other is passed through the annular space between the first conduit and a second conduit concentric with and surrounding the first conduit. The two gases are discharged from their respective passageways into admixture with one another. Either the oxygen or the fuel gas may be supplied through the inner conduit; the other reactant is supplied through the outer conduit.

When oxygen is supplied through the inner conduit, then any methane which remains unmixed with oxygen in the outer zone of the resulting flame undergoes thermal cracking due to the temperature within the reactor and forms a sooty flame. The formation of soot or free carbon is undesirable from the standpoint of reducing the yield of product gas. It is also undesirable in commercial operations because it results in fouling the equipment, particularly cooling tubes used for the generation of steam for the recovery of heat from the product gas. Other equipment, such as condensers and compressers are subject to fouling by the carbon in the product gas.

On the other hand, when oxygen is fed through the annular space, then any unmixed oxygen in the outer zone of the flame will damage whatever material which it might impinge upon, such as metal or refractory associated with the burner or reactor.

Another type burner which may be employed for the generation of synthesis gas is one in which the gases are separately introduced into the reactor through adjacent openings taking other forms, for example, parallel slots. This type burner is subject to the same problems as discussed hereinabove with regard to the annulus type burner.

To overcome the disadvantages of these burners, by the present invention, three gases are supplied to the burner, i. e., fuel gas, oxygen, and recycled product gas. In the application of my invention to an annulus type burner, fuel gas is supplied through a central conduit, oxygen is supplied through the annular space between the central conduit and a surrounding concentric conduit, and recycle gas is supplied through an annular passageway between the oxygen conduit and a third conduit concentric with and surrounding the other two. In a burner of the type in which one or both of the reactant gases are introduced through a plurality of outlets, provision is made for introducing recycle gas through openings adjacent the oxygen outlet and opposite the fuel gas outlet, so that the exterior of the resulting flame will be blanketed with the recycle gas. The invention will be better understood from the following detailed description.

Figure 1 of the drawings is a diagrammatic cross-sectional view of an annulus-type burner embodying the principles of the present invention.

Figure 2:
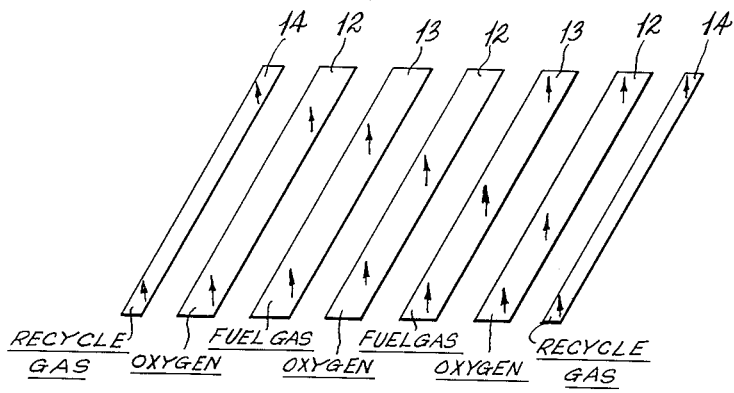

Figure 2 illustrates diagrammatically in perspective a suitable arrangement of the various gas streams in a burner of the type employing a plurality of adjacent parallel slots for the introduction of reactants.

With reference to Figure 1 of the drawings, a fuel gas, for example, natural gas, is supplied to a central conduit 5 of an annulus type burner modified to incorporate the principles of the present invention. A conduit 6, concentric with conduit 5, surrounds conduit 5 providing an annular passageway 7 through which oxygen is introduced to the burner. The natural gas and oxygen pass in the same direction through the passageways and are discharged into admixture with one another in the usual manner. Conduits 5 and 6 constitute a conventional annulus type burner. Details of the specific manner in which the conduits are terminated in order to provide good mixing of the fuel gas and oxygen are not described herein, since they are not essential to the description of the present invention.

In accordance with the present invention, an outer conduit 8 is provided surrounding and concentric with conduits 5 and 6 and providing an annular passageway 9 through which recycle gas may be passed. The recycle gas discharged from the annular passageway envelops the oxygen stream and prevents impingement of free oxygen on nearly surfaces.

Figure 2 represents a slot type burner with oxygen and methane supplied to alternate slots. Slots 12, or discharge passageways, are provided for the introduction of oxygen to the reactor. Similarly, slots 13, intermediate slots 12, are provided for the introduction of fuel gas. A series of a relatively large number of slots may be provided in a single burner. Mixing takes place between the gases discharged through adjacent slots. In this arrangement, as in the arrangement of the annulus type burner described above, the oxygen is "on the outside" of the fuel gas. In other words, each stream of fuel gas is substantially surrounded by oxygen. At each end of the burner, adjacent the oxygen slots, similar slots 14 are provided for discharging streams of recycle gas. Thus, in a burner having provisions for producing several contiguous jets of reactant gases, only the outermost or terminal jets are recycle gas.

Since the purpose of the recycle gas is to prevent impingement of oxygen on adjacent surfaces, the quantity required is relatively small. In an annulus type burner not more than about ten per cent of the gas produced by the burner is generally necessary as recycle gas. In a burner employing a number of discharge ports for the oxygen and gas streams, for example, a burner of the type illustrated in Figure 2, the quantity of recycle gas may be even less.

Obviously many modifications and variations of the invention as hereinbefore set forth may be made without departing from the spirit and scope thereof and, therefore, only such limitations should be imposed as are indicated in the appended claims.

I claim:

1. In a process for the partial combustion of a hydrocarbon wherein the hydrocarbon in gaseous form and an oxygen-containing gas are introduced as separate streams into a reaction zone into admixture with one another to produce a product gas comprising carbon monoxide and hydrogen substantially completely free from uncombined carbon, the improvement which comprises introducing product gas into said zone to form a stream substantially surrounding said hydrocarbon and oxygen-containing gas.

2. In a process for the partial combustion of a hydrocarbon wherein the hydrocarbon in gaseous form and an oxygen-containing gas are introduced as separate streams into a reaction zone into admixture with one another to produce a product gas comprising carbon monoxide and hydrogen substantially completely free from uncombined carbon, the improvement which comprises introducing a stream of said hydrocarbon into said zone, introducing at least one stream of said oxygen-containing gas into said zone adjacent and substantially surrounding said stream of hydrocarbon, and introducing at least one stream of said product gas into said zone adjacent and substantially surrounding said oxygen-containing gas stream.

3. A process as defined in claim 2 wherein said stream of oxygen-containing gas is introduced annularly of said stream of hydrocarbon and said stream of product gas is introduced annularly of said stream of oxygen-containing gas.

4. In a process for the partial combustion of a hydrocarbon wherein the hydrocarbon in gaseous form and an oxygen-containing gas are introduced as separate streams into a reaction zone into admixture with one another to produce a product gas comprising carbon monoxide and hydrogen substantially completely free from uncombined carbon, the improvement which comprises introducing a plurality of alternate adjacent streams of hydrocarbon and oxygen-containing gas arranged so that each stream of hydrocarbon is intermediate two streams of oxygen-containing gas, the plurality of streams terminating at each end with a stream of oxygen-containing gas; and introducing a stream of product gas adjacent each of the terminal streams of oxygen-containing gas.

References Cited in the file of this patent

UNITED STATES PATENTS

| Number | Name | Date |
|---|---|---|
| 964,031 | Leahy | July 12, 1910 |
| 1,073,108 | Eldred | Sept. 16, 1913 |
| 1,616,124 | Holcombe | Feb. 1, 1927 |
| 1,902,797 | Burke | Mar. 21, 1933 |
| 1,954,991 | Garner et al. | Apr. 17, 1934 |
| 2,011,339 | Hillhouse | Aug. 13, 1935 |
| 2,564,736 | Stokes | Aug. 21, 1951 |
| 2,623,811 | Williams | Dec. 30, 1952 |